United States Patent
Shimaoka et al.

(10) Patent No.: US 7,791,458 B2
(45) Date of Patent: Sep. 7, 2010

(54) ALERTING ILLUMINATION DEVICE

(75) Inventors: Keiichi Shimaoka, Nagoya (JP); Kanae Murata, Nagoya (JP); Yuichi Tanaka, Seto (JP); Yoshiteru Omura, Seto (JP); Isao Aoyagi, Aichi-gun (JP); Norio Fujitsuka, Nisshin (JP); Hiroyuki Matsubara, Seto (JP)

(73) Assignee: Kabushiki Kaisha Toyota Chuo Kenkyusho, Aichi-Gun (JP)

( * ) Notice: Subject to any disclaimer, the term of this patent is extended or adjusted under 35 U.S.C. 154(b) by 329 days.

(21) Appl. No.: 11/984,085

(22) Filed: Nov. 13, 2007

(65) Prior Publication Data

US 2008/0175012 A1 Jul. 24, 2008

(30) Foreign Application Priority Data

Nov. 17, 2006 (JP) .............................. 2006-311863
Oct. 11, 2007 (JP) .............................. 2007-265379

(51) Int. Cl.
*B60Q 1/00* (2006.01)

(52) U.S. Cl. ........................ 340/435; 340/903; 348/148

(58) Field of Classification Search ................ 340/901, 340/903, 435, 436; 348/148, 149; 701/301
See application file for complete search history.

(56) References Cited

U.S. PATENT DOCUMENTS 7,278,505 B2 * 10/2007 Fujioka et al. .............. 180/170
7,362,241 B2 * 4/2008 Kubota et al. ............ 340/995.1
7,561,180 B2 * 7/2009 Koike .......................... 348/148
2006/0097858 A1 * 5/2006 Kumabe et al. ............. 340/435
2006/0164219 A1 * 7/2006 Knoll .......................... 340/435

FOREIGN PATENT DOCUMENTS

JP A-2005-324679 11/2005

* cited by examiner

*Primary Examiner*—Brent Swarthout
(74) *Attorney, Agent, or Firm*—Oliff & Berridge, PLC

(57) ABSTRACT

An alerting illumination device, which includes a detecting component, a danger degree estimating component, a danger assuming component, an illuminating component and a controlling component, is provided. The danger degree estimating component estimates a degree of danger, with respect to a subject vehicle, of the person detected by the detecting component. The danger assuming component, on the basis of the estimated degree of danger, assumes whether or not the person detected by the detecting component is a danger with respect to the subject vehicle. The illuminating component illuminates light. The controlling component, in a case in which the danger assuming component assumes that the person is a danger, controls the illuminating component such that light, which shows a direction of the person who is assumed to be a danger and a distance to the person, is illuminated onto a road surface.

15 Claims, 19 Drawing Sheets

TOP SURFACE PORTION

SIDE SURFACE PORTION

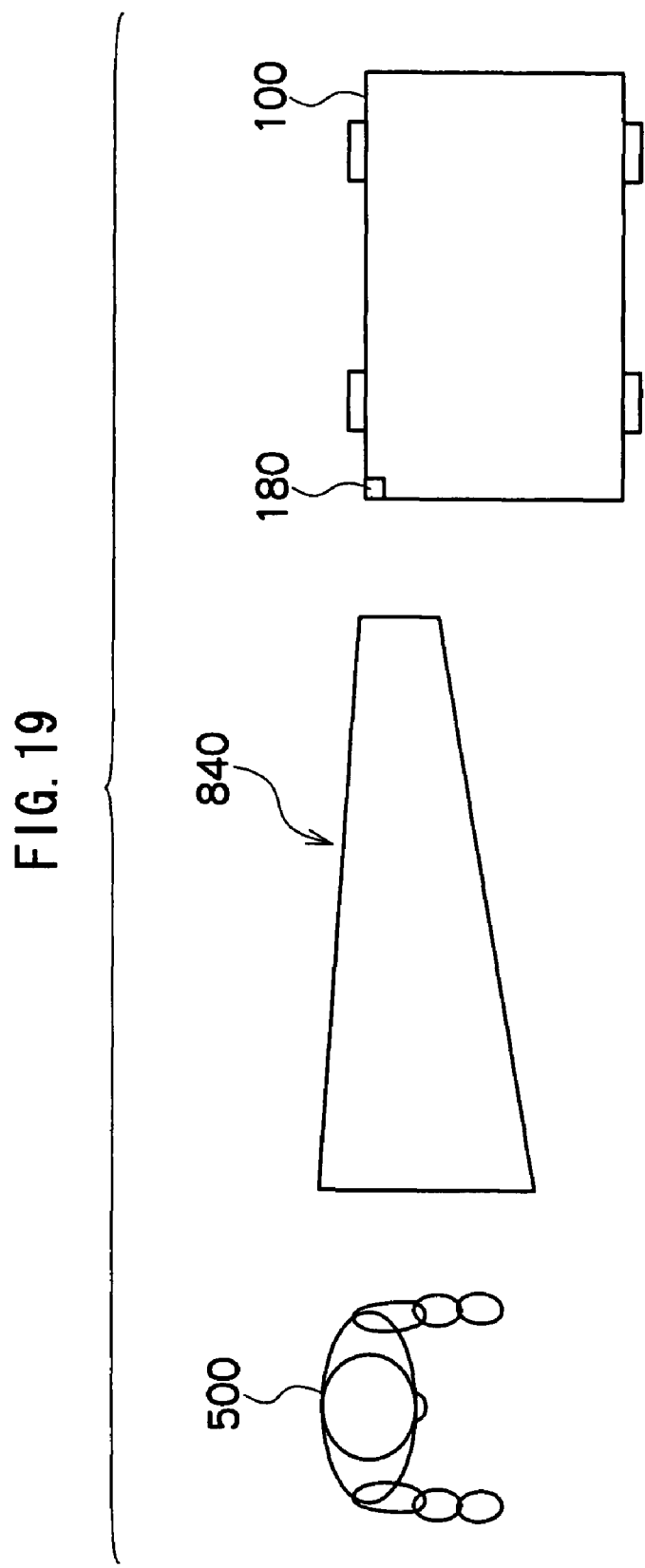

ALERTING ILLUMINATION DEVICE

CROSS-REFERENCE TO RELATED APPLICATION

This application claims priority under 35 USC 119 from Japanese Patent Applications No. 2006-311863 and No. 2007-265379, the disclosures of which are incorporated by reference herein.

BACKGROUND OF THE INVENTION

1. Field of the Invention

The present invention relates to an alerting illumination device, and in particular, to an alerting illumination device for a vehicle which can alert both the driver and a person regardless of the color of the clothing of the person.

2. Description of the Related Art

There is conventionally known an alarm device for alerting the driver of an own vehicle and a person outside of the vehicle by illuminating illumination light such that the driver of an oncoming vehicle is not blinded (see, for example, Japanese Patent Application Laid-Open (JP-A) No. 2005-324679).

The alarm device of JP-A No. 2005-324679 illuminates illumination light of a predetermined mark (pattern), e.g., a triangular mark, with respect to a person when the person exists outside of an oncoming vehicle region. Further, if a person exists within the oncoming vehicle region, the alarm device reciprocatingly moves a spot, which is formed on the road surface by illuminated light, between the person and the own vehicle, outside of the oncoming vehicle region.

However, in a case in which a person exists outside of the oncoming vehicle region, even if a predetermined pattern is illuminated with respect to the person, if the person's clothes are black, the light is absorbed by the clothes. Therefore, it is difficult to perceive the illuminated pattern, and thus, it is difficult for the driver to perceive the person who is in danger.

Further, if a spot is moved reciprocatingly in a case in which a person exists within the oncoming vehicle region, the pattern will, on its return path, head toward the own vehicle, and there are drivers who feel a disharmonious sensation.

SUMMARY OF THE INVENTION

The present invention has been developed in order to overcome the above-described problems, and an object thereof is to provide an alerting illumination device which can alert both a driver and a person regardless of the color of the person's clothes.

An alerting illumination device of an aspect of the present invention includes: a detecting component that detects a person; a danger degree estimating component that estimates a degree of danger, with respect to an own vehicle, of the person detected by the detecting component; a danger assuming component that, on the basis of the degree of danger estimated by the danger degree estimating component, assumes whether or not the person detected by the detecting component is in danger with respect to the own vehicle; an illuminating component that illuminates light; and a controlling component that, in a case in which the danger assuming component assumes that the person is in danger, controls the illuminating component such that light, which shows a direction of the person who is assumed to be in danger and a distance to the person, is illuminated onto a road surface.

BRIEF DESCRIPTION OF THE DRAWINGS

FIG. 19 is a drawing showing an illumination pattern of the second exemplary embodiment of the present invention.

DETAILED DESCRIPTION OF THE INVENTION

Exemplary embodiments of an alerting illumination device of the present invention will be described in detail hereinafter with reference to the drawings.

First Exemplary Embodiment

Figure 1A:
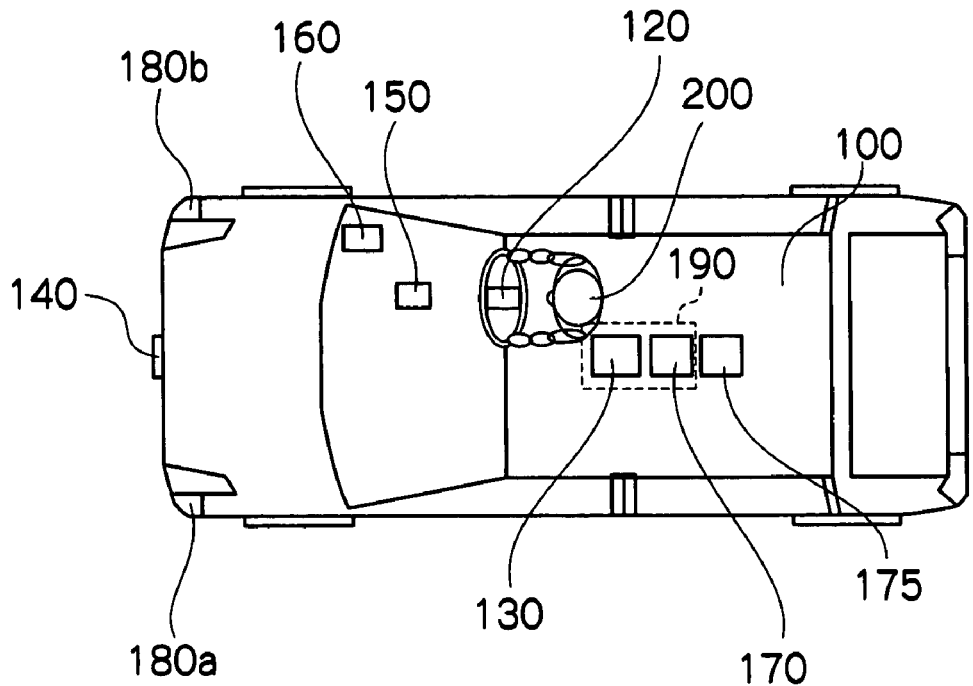
FIG. 1A and FIG. 1B are schematic drawings showing an exemplary embodiment of the present invention.
Figure 1B:
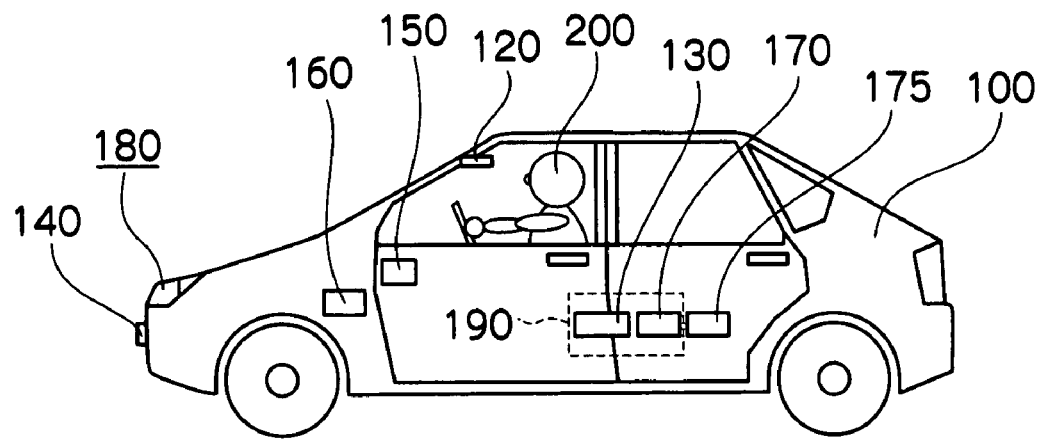
Figure 2:
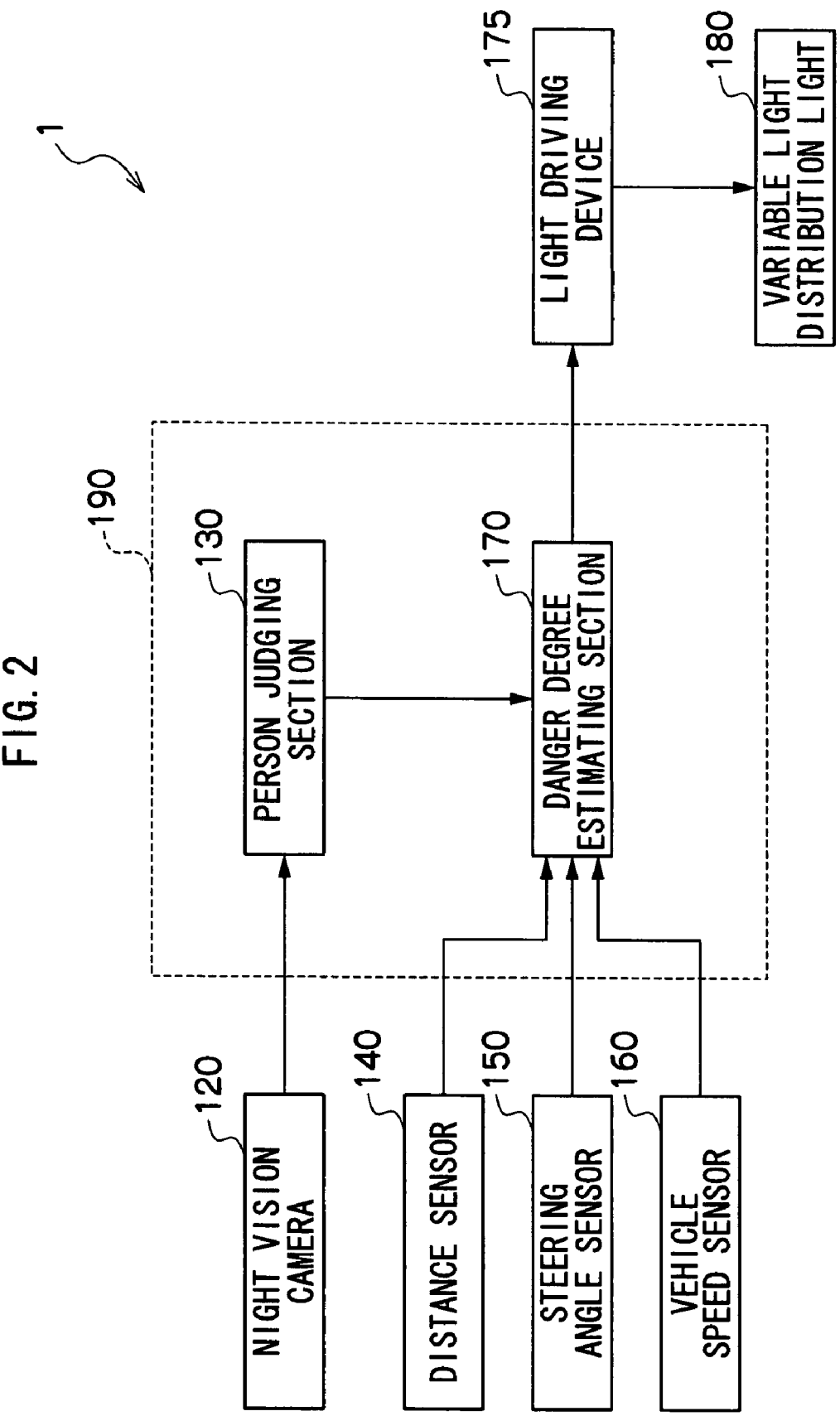
FIG. 2 is a block diagram of an alerting illumination device of a first exemplary embodiment of the present invention.

As shown in FIG. 1A, FIG. 1B and FIG. 2, a night vision camera 120, a distance sensor 140, a steering angle sensor 150, a vehicle speed sensor 160, and a control device 190 are provided at an alerting illumination device 1 which relates to a first exemplary embodiment and is mounted to a vehicle 100.

An infrared camera, for example, is used as the night vision camera 120. The night vision camera 120 photographs the region in front of the own vehicle 100, and outputs the thermal image obtained by photographing as thermal image data. The night vision camera 120 is connected to the control device 190.

The control device 190 is structured by a microcomputer which includes a ROM, which stores programs of various types of processing routines, and a RAM, which temporarily stores data. When expressing the microcomputer, which executes the control routine which will be described later, by function blocks, the control device 190 can be expressed as a person judging section 130 and a danger degree estimating section 170. The night vision camera 120 is connected to the person judging section 130. The distance sensor 140, the steering angle sensor 150, the vehicle speed sensor 160, and a light driving device 175 are connected to the danger degree estimating section 170.

Due to the person judging section 130 detecting the characteristics of a person (e.g., temperature, shape, and the like) by carrying out image processing such as pattern matching or the like on the basis of the thermal image data from the night vision camera 120, the person judging section 130 detects a person such as a pedestrian, a rider on a two-wheeled vehicle, or the like who is positioned in front of the own vehicle 100. The person judging section 130 is connected to the danger degree estimating section 170.

The distance sensor 140 uses a millimeter wave radar for example, and detects the distance to the person who is detected by the person judging section 130. From the detected distance, the relative moving speed of the person and the relative position of the person (the distance from the own vehicle 100 to the person and the direction in which the person is positioned with respect to the own vehicle 100) can be determined.

The steering angle sensor 150 detects the steering angle. The moving direction of the own vehicle 100 can be determined from the detected steering angle. Further, the vehicle speed sensor 160 detects the number of revolutions of the wheel. The moving speed of the own vehicle 100 can be determined from the detected number of revolutions of the wheel.

On the basis of a distance signal from the distance sensor 140, the danger degree estimating section 170 computes the relative moving speed and the relative moving direction of the person with respect to the own vehicle 100. The danger degree estimating section 170 computes the moving speed of the person from the difference between the computed relative moving speed of the person and the moving speed of the own vehicle 100 which is computed on the basis of a detection signal from the vehicle speed sensor 160. Further, the danger degree estimating section 170 computes the moving direction of the person from the difference between the computed relative moving direction of the person and the moving direction of the own vehicle 100 which is computed on the basis of a steering angle signal from the steering angle sensor 150.

Further, the danger degree estimating section 170 computes a degree of danger of the person with respect to the own vehicle 100, on the basis of the computed moving speed and moving direction of the own vehicle 100 and the computed moving speed and moving direction of the person.

By comparing the estimated degree of danger and a reference value, the danger degree estimating section 170 assumes whether or not the person is in danger with respect to the own vehicle 100.

The light driving device 175, which is connected to variable light distribution lights 180 (180*a*, 180*b*), is connected to the danger degree estimating section 170. On the basis of an instruction from the danger degree estimating section 170, the light driving device 175 controls the light distribution (the form of illumination) of the light illuminated from the variable light distribution light 180.

If the danger degree estimating section 170 assumes that the person detected by the person judging section 130 is in danger, the danger degree estimating section 170 outputs to the light driving device 175 an instruction to illuminate, onto the road surface, light for alerting both the driver and the person who is assumed to be in danger, e.g., light expressing the direction, from the own vehicle 100, of the person who is assumed to be in danger and the distance to that person.

The variable light distribution light 180 is structured by a lamp and a light distribution control device which controls the light distribution of light illuminated from the lamp. The light distribution control device can be structured by a reflecting-type spatial light modulating element such as a DMD (digital micromirror device) or the like which controls the light distribution by reflecting the light of the lamp, or a transmitting-type spatial light modulating element such as a liquid crystal display element or the like which controls the light distribution by transmitting the light of the lamp.

At the variable light distribution light 180, a predetermined light distribution can be obtained by either driving the light distribution control device and lighting the lamp so that the predetermined light distribution is obtained, or by driving the light distribution control device so that the predetermined light distribution is obtained while the lamp is in a lit state.

Figure 3:
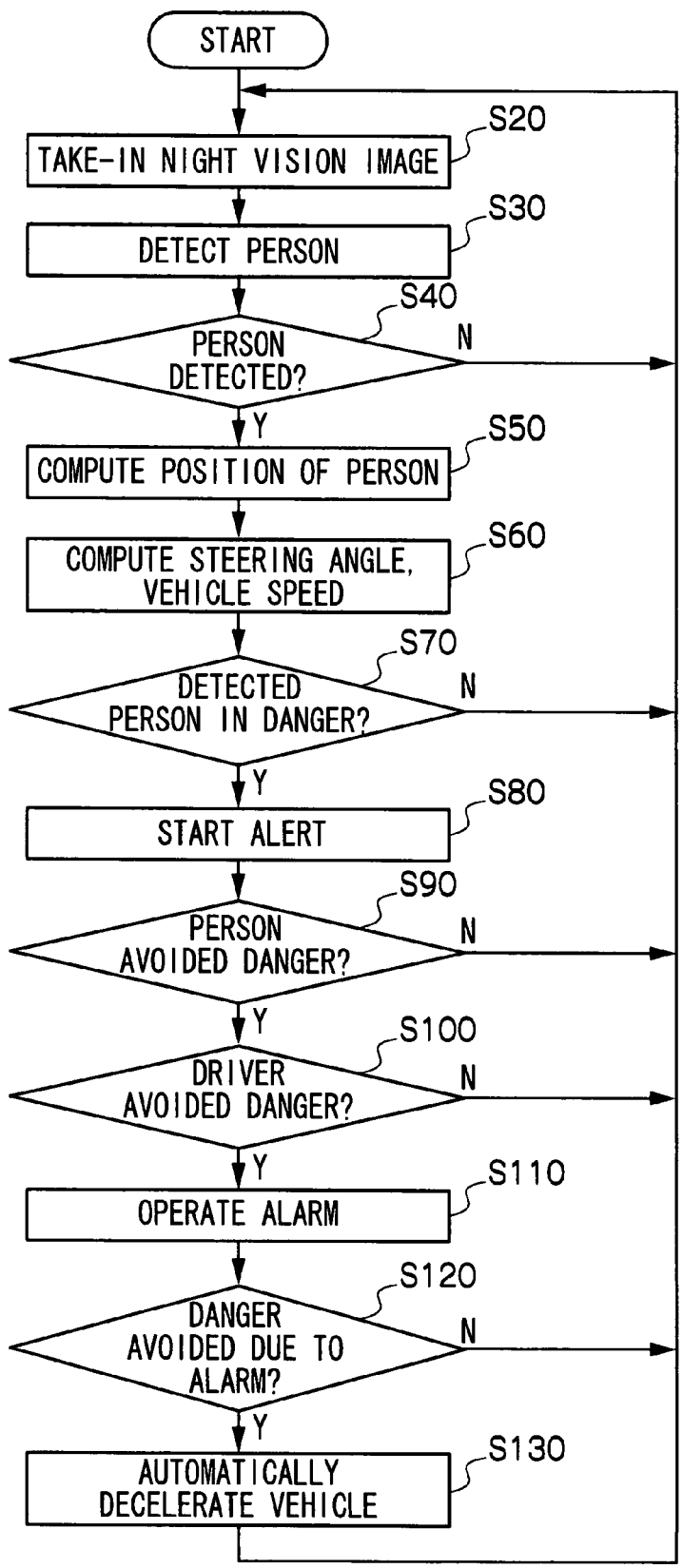
FIG. 3 is a flowchart showing a control routine carried out by a CPU of a control device of the alerting illumination device of the exemplary embodiment of the present invention.

FIG. 3 is a flowchart showing a control routine carried out by the CPU of the control device 190 of the alerting illumination device 1 of the present exemplary embodiment.

This control routine is executed when the power source of the alerting illumination device 1 is turned on. In step S20, the night vision camera 120 is driven, and the thermal image data obtained by photographing the region in front of the own vehicle 100 is taken-in as thermal image data. In next step S30, detection of a person positioned in front of the own vehicle 100 is carried out on the basis of the thermal image data.

In subsequent step S40, it is judged whether or not a person is detected in step S30. If this judgment is negative, the routine returns to step S20 and detecting of a person is continued. If the judgment is affirmative, the routine moves on to next step S50.

In step S50, the distance signal outputted from the distance sensor 140 is taken-in, and the relative moving speed and relative position, with respect to the own vehicle 100, of the person detected in step S30 are computed.

In next step S60, the steering angle signal outputted from the steering angle sensor 150 is taken-in, and computation of the moving direction of the own vehicle 100 is started. Further, the detection signal, which expresses the moving speed of the own vehicle 100 detected by the vehicle speed sensor 160, is taken-in, and computation of the moving speed of the own vehicle 100 is started.

In subsequent step S70, the moving speed and the moving direction of the person are computed on the basis of the moving direction and moving speed of the own vehicle 100 and the relative moving speed and the relative position of the person, which were computed. Then, the degree of danger of the person with respect to the own vehicle 100 is estimated on the basis of the computed moving speed and moving direction of the person and the computed moving direction and moving speed of the own vehicle 100. Then, by comparing the estimated degree of danger and a reference value, it is assumed whether or not the person is in danger with respect to the own vehicle 100.

Here, if it is assumed that the person is not in danger, the routine returns to step S20, and the above-described processings are repeated. On the other hand, if it is assumed that the person is in danger, the routine moves on to next step S80.

In step S80, on the basis of the relative moving speed and relative position of the person assumed to be in danger in step S70, an instruction is outputted to the light driving device 175 such that a light shown in FIG. 6 through FIG. 14 which will be described later, e.g., a light indicating the direction from the own vehicle 100 of the person assumed to be in danger and the distance to that person, is illuminated onto the road surface in order to alert a driver 200 and the person.

Here, the processings which are carried out in step S70 and step S80 will be described by using an example.

Figure 4:
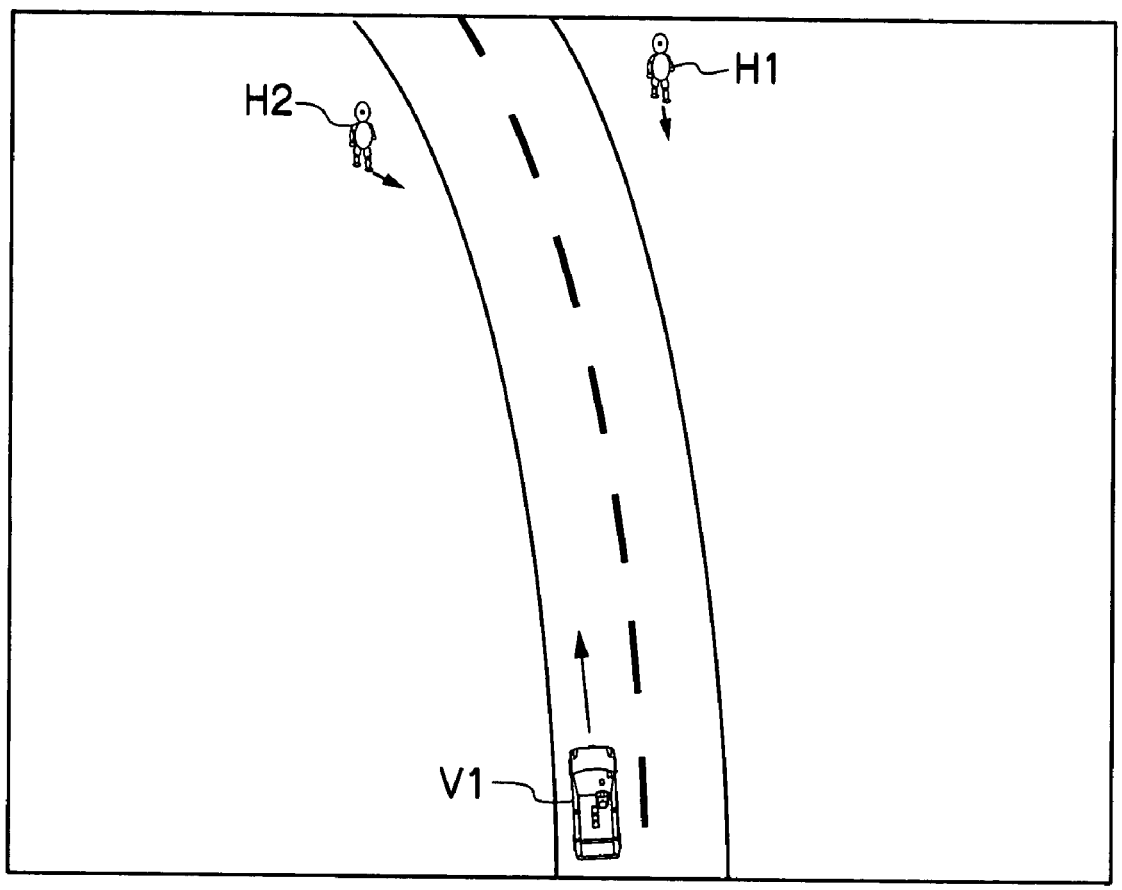
FIG. 4 is a drawing for explaining processings carried out in step S70 and step S80 of the flowchart of FIG. 3.

Description is given by using as an example a situation in which, as shown in FIG. 4, an own vehicle V1 approaches a left curve, and a first person H1 and a second person H2 exist ahead thereof.

At this time, in step S50, the CPU of the control device 190 computes the relative moving speeds and relative positions of the detected persons H1 and H2, on the basis of distance signals from the distance sensor 140. Then, on the basis of the computed relative moving speeds and relative positions, and the computed moving direction and moving speed of the own vehicle 100, the CPU of the control device 190 repeatedly computes the moving speeds and the moving directions of the persons H1 and H2, and determines the changes in the distances and the changes in the positions of the persons H1 and H2. Then, the CPU of the control device 190 infers the moving speeds and the moving directions of the persons H1 and H2 on the basis of the determined changes in distance and changes in position.

Further, in step S60, on the basis of the steering angle signal taken-in from the steering angle sensor 150, the CPU of the control device 190 repeatedly computes the moving direction of the own vehicle V1, and determines the changes in the moving direction of the own vehicle V1. Moreover, on the basis of the detection signal taken-in from the vehicle speed sensor 160, the CPU of the control device 190 repeatedly computes the moving speed of the own vehicle V1, and determines the changes in the moving speed of the own vehicle V1. Then, on the basis of the changes in the moving direction and the changes in the moving speed of the own vehicle V1, the CPU of the control device 190 infers the moving speed and the moving direction of the own vehicle V1.

Figure 5:
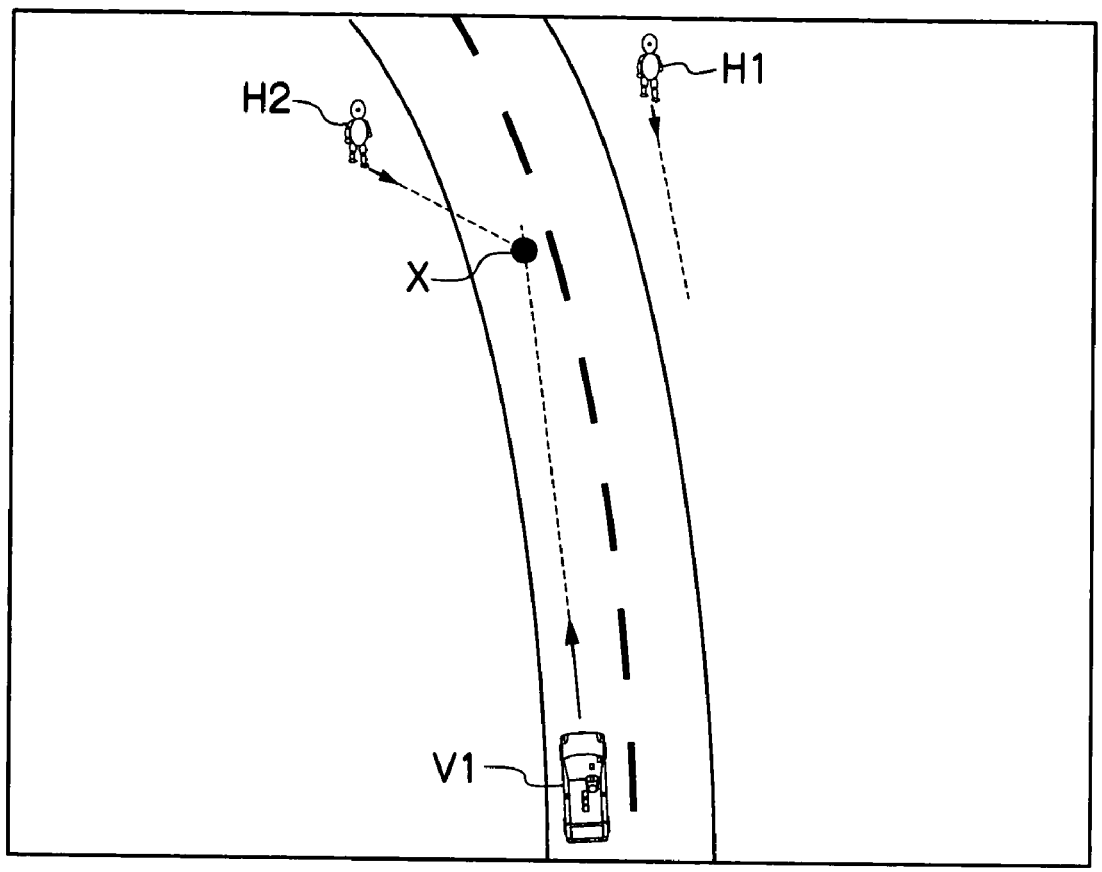
FIG. 5 is a drawing for explaining the processings carried out in step S70 and step S80 of the flowchart of FIG. 3.

Then, on the basis of the moving speeds and the moving directions of the persons H1 and H2 which are estimated in step S70, and the estimated moving speed and moving direction of the own vehicle V1, the CPU of the control device 190 determines probabilities of collisions between the person H1 and the own vehicle V1 and the person H2 and the own vehicle V1. By comparing the determined probabilities with a predetermined value, the CPU of the control device 190 assumes whether or not the persons H1 and H2 are in danger with respect to the own vehicle V1. For example, as shown in FIG. 5, in a case in which it is assumed that there is a high probability that the own vehicle V1 and the person H2 will collide at geographical point X after time t (e.g., 6 seconds later) which is less than or equal to a predetermined time $t_{max}$, i.e., in a case in which it is assumed that the person H2 is in danger with respect to the own vehicle V1, the following processings are carried out in step S80. Namely, in step S80, on the basis of the moving speed and the moving direction of the person H2, and the distance to the person H2 and the direction of the person H2 from the own vehicle V1, the CPU of the control device 190 outputs an instruction to the light driving device 175 such that a light shown in FIG. 6 through FIG. 14 which will be described later, e.g., a light indicating the direction of the person H2 assumed to be in danger and the distance to the person H2 from the own vehicle V1, is illuminated by the variable light distribution lights 180 in order to alert the driver 200 and the person H2. Note that the estimated time t until a collision expresses the degree of danger, and the lower the number, the higher the degree of danger.

In next step S90, it is judged whether or not the person assumed to be in danger notices the approach of the own vehicle 100 and avoids danger due to the alert carried out in step S80. This judgment is carried out, for example, by judging that the danger is avoided in a case in which it is sensed that the person is stationary or the person has moved in a direction of avoiding the danger, and judging that the danger is not avoided in a case in which it is sensed that the person is not stationary and is moving in the same direction, by detecting the movement of the position of the thermal image data of the person assumed to be in danger which is taken-in from the night vision camera 120. Here, in the case in which it is sensed that the person is stationary or the person has moved in a direction of avoiding the danger, i.e., in the case of judging that the danger is avoided, the routine returns to step S20, and the above-described processings are repeated. On the other hand, in the case in which it is sensed that the person is not stationary and is moving in the same direction, i.e., in the case of judging that the danger is not avoided, the routine moves on to step S100.

In step S100, it is judged whether or not the driver 200 notices the approach of the person and avoids the danger. This judgment is carried out by, for example, assuming whether or not the person who is assumed to be in danger in step S70 with respect to the own vehicle 100 is still in danger, and, on the basis of the results of this assumption, judging whether or not the danger is avoided.

Here, in a case in which the driver 200 notices the approach of the person and avoids the danger, e.g., in a case in which, due the driver 200 decelerating the speed of the own vehicle 100 or changing the traveling direction, the degree of danger with respect to the own vehicle 100 of the person assumed to be in danger in step S70 decreases and it is assumed that the person is not in danger with respect to the own vehicle 100, it is judged that the danger is avoided, and an instruction is outputted to the light driving device 175 to stop the illumination of the light by the variable light distribution light 180 for alerting which was started in step S80, and the routine returns to step S20, and the above-described processings are repeated. On the other hand, in a case in which the degree of danger with respect to the own vehicle 100 of the person assumed to be in danger in step S70 does not decrease and it is assumed that the person is still in danger, it is judged that the danger is not avoided, and the routine moves on to step S110.

In step S110, an instruction to generate an alarm is outputted to an alarm device, in order to inform the driver 200 that the person is approaching the own vehicle 100.

In subsequent step S120, it is judged whether or not the driver 200 notices the approach of the person and avoids the danger due to the alarm issued by the alarm device in step S110. For example, in a case in which, due to the driver 200 decelerating the speed of the own vehicle 100 or changing the traveling direction, the degree of danger with respect to the own vehicle 100 of the person assumed to be in danger in step S70 decreases and it is assumed that the person is not in danger with respect to the own vehicle 100, it is judged that the danger is avoided, and the routine returns to step S20 and the above-described processings are repeated. On the other hand, in a case in which the degree of danger of the person with respect to the own vehicle 100 does not decrease and it is assumed that the person is still in danger, it is judged that the danger is not avoided, and the routine moves on to next step S130.

In step S130, an instruction to decelerate to a predetermined speed is outputted to a vehicle speed control section which controls the vehicle speed of the own vehicle 100, in order to decrease the speed of the own vehicle 100.

Then, the routine returns to step S20, and the above-described processings are repeated.

Note that steps S20 through S40 and step S90 of the present control routine are executed at the person judging section 130, and steps S50 through S80 and steps S100 through S130 are executed at the danger degree estimating section 170.

FIG. 6 through FIG. 14 are drawings showing various types of illumination forms (illumination form 1 through illumination form 9) of the light which is illuminated from the variable light distribution light 180 in accordance with the control of the light driving device 175 to which an instruction is outputted from the control device 190 in step S80 of the present control routine.

[Illumination Form 1]

Figure 6:
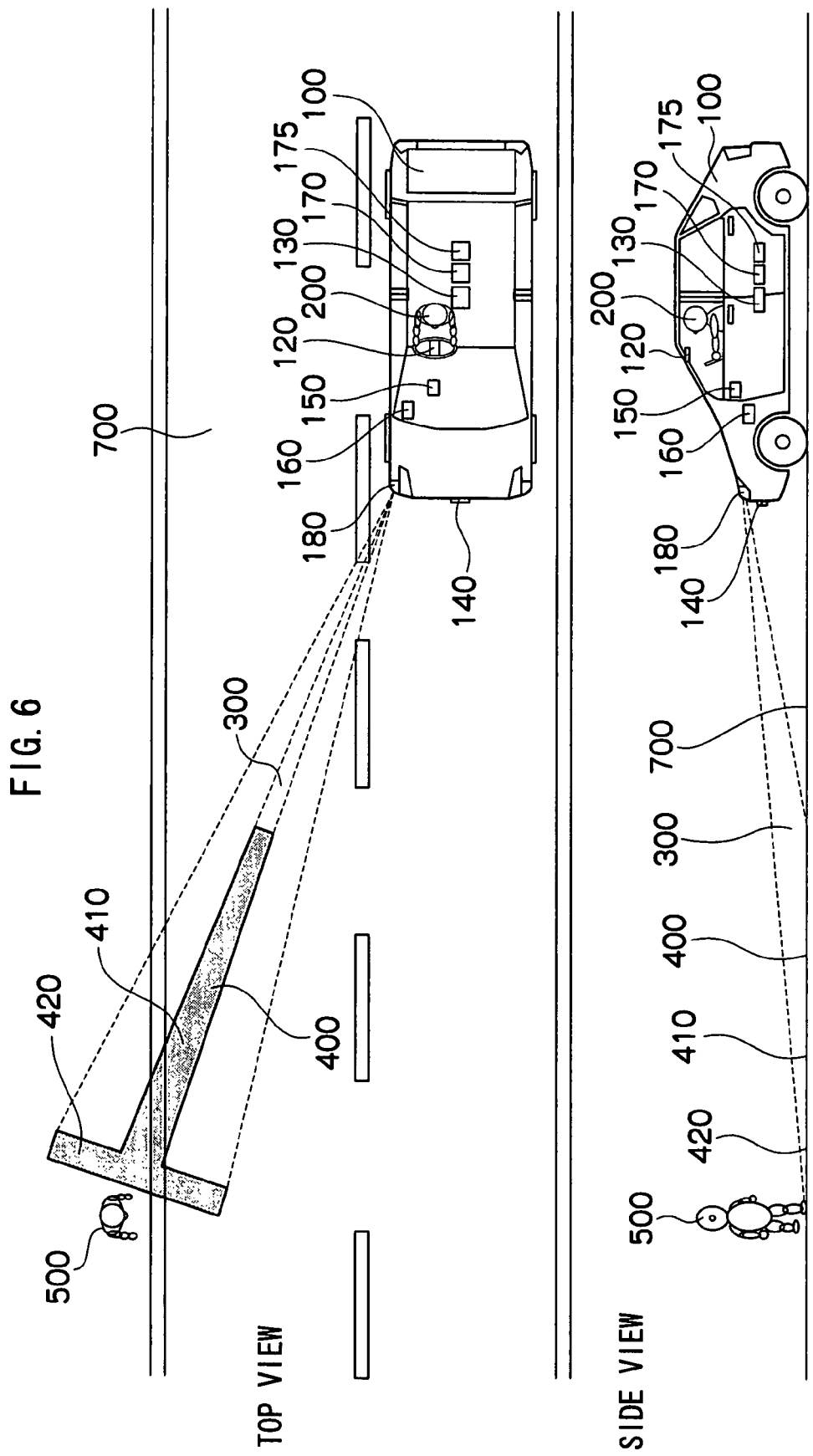
FIG. 6 is a drawing showing illumination form 1.

As shown in FIG. 6, illuminated light 300 of a T-shaped illumination pattern 400 is illuminated onto a road surface 700 toward a person 500. As shown in this drawing, a line 410 extending from the own vehicle 100 to the person 500 is an illumination pattern showing the direction of the person 500 from the own vehicle 100. A line 420 extending laterally at this side of the person 500 is an illumination pattern showing the distance from the own vehicle 100 to the person 500.

[Illumination Form 2]

Figure 7:
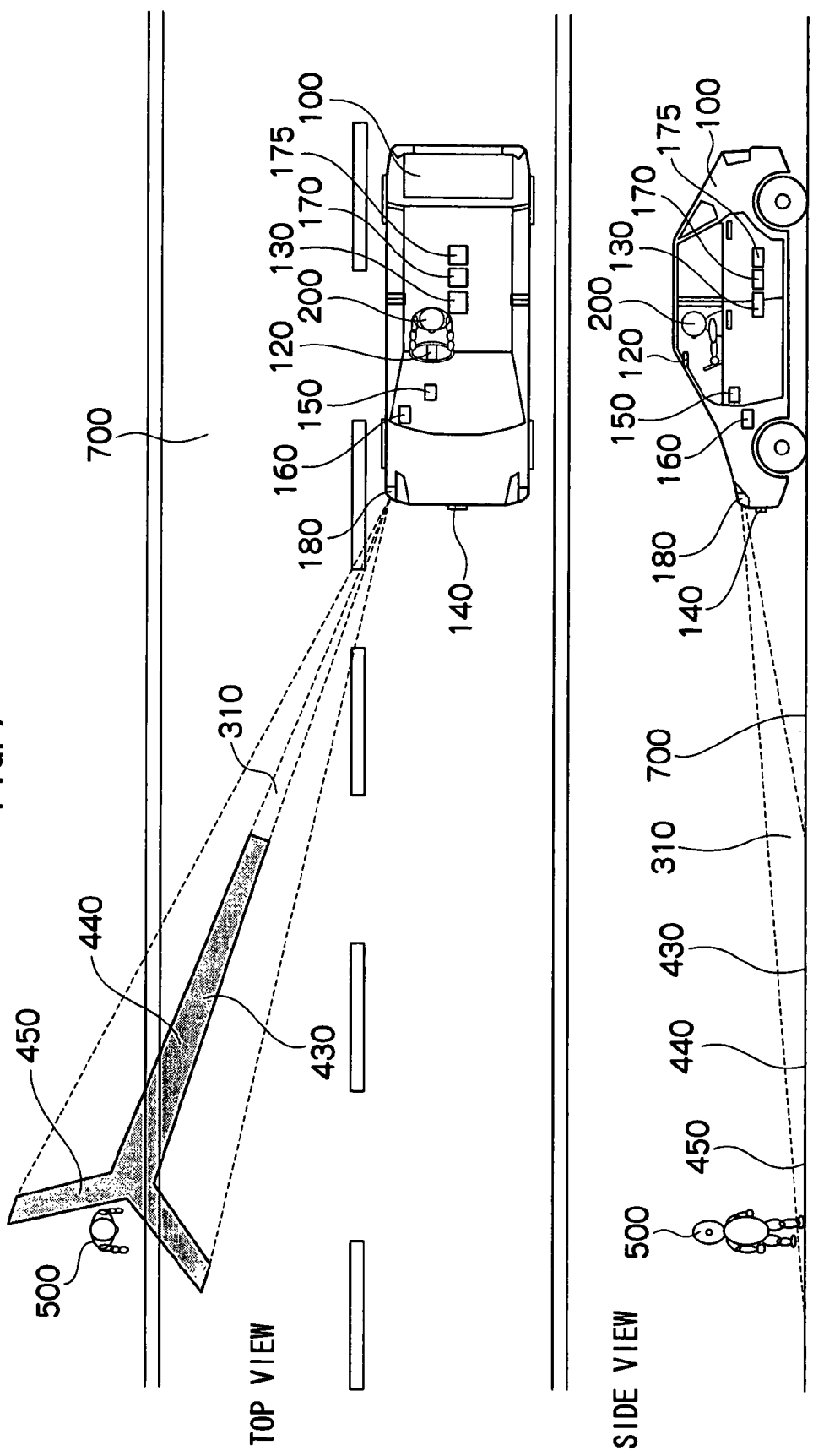
FIG. 7 is a drawing showing illumination form 2.

As shown in FIG. 7, illuminated light 310 of a Y-shaped illumination pattern 430 is illuminated onto the road surface 700 toward the person 500. As shown in this drawing, a line 440 extending from the own vehicle 100 to the person 500 is an illumination pattern showing the direction of the person 500 from the own vehicle 100. A line 450 extending laterally at this side of the person 500 is an illumination pattern showing the distance from the own vehicle 100 to the person 500.

Note that the illuminated light 300 of the illumination pattern 400 shown in FIG. 6 or the illuminated light 310 of the illumination pattern 430 shown in FIG. 7 may be illuminated to beneath the eyes of the person 500.

[Illumination Form 3]

Figure 8:
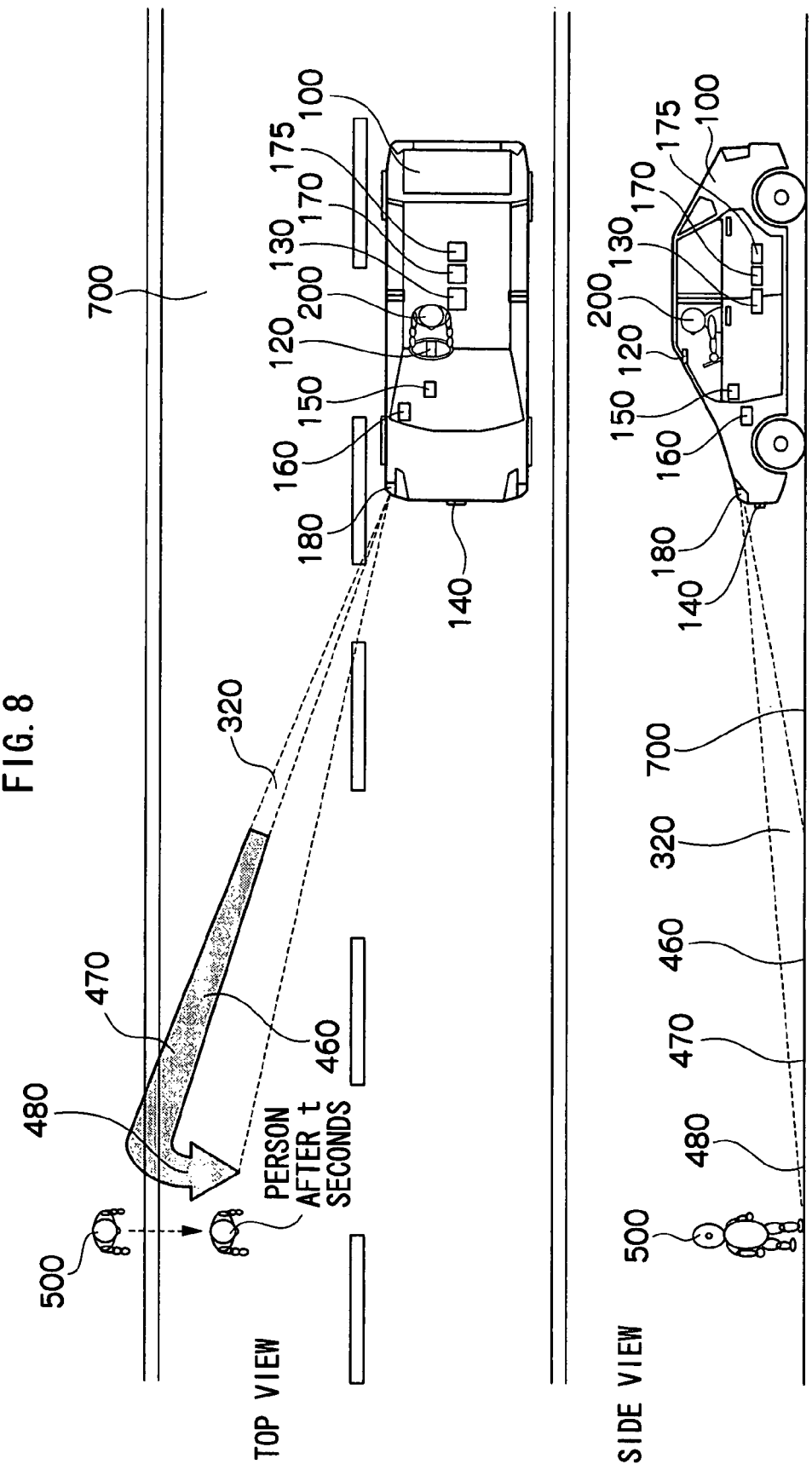
FIG. 8 is a drawing showing illumination form 3.

As shown in FIG. 8, illuminated light 320 of an illumination pattern 460, which is in the shape of an arrow indicating the direction of movement of the person 500 assumed by the danger degree estimating section 170, is illuminated onto the road surface 700. As shown in this drawing, a line 470 extending from the own vehicle 100 to the person 500 is an illumination pattern showing the direction from the own vehicle 100 to the person 500 at the current point in time. A line 480, which bends at this side of the person 500 and at whose distal end there is an arrow, is an illumination pattern showing the distance from the own vehicle 100 to the person 500 and is an illumination pattern showing the moving direction of the person 500.

Note that, as the degree of danger of the person 500 estimated by the danger degree estimating section 170 increases, in step S80 of the present control routine, the control device 190 may output to the light driving device 175 an instruction to make the shape of the illumination pattern larger, or to make the flashing period of the flashing state of the illumination pattern shorter or to make the color of the illumination pattern approach the color red in the illumination forms shown in FIG. 6 through FIG. 8, in order to increase the ability to draw attention which is the driver 200 instinctively focusing on and looking at something that is moving or something that is conspicuous, i.e., in order to increase the attention-drawing effect.

Further, the illumination pattern 460 of illumination form 3 shown in FIG. 8, which is an arrow showing the moving direction of the person 500, may be obtained in accordance with the locus of movement of the illuminated position obtained by moving the illuminated position of the illuminated light on the road surface 700 from the own vehicle 100 to the person 500. In this case, the illumination pattern 460 is not limited to an arrow, and may be obtained in accordance with the locus of movement of a spotlight which shows the moving direction of the person 500, or the like. For example, it may be an illumination pattern such as that which will be described in detail in following "[Illumination Form 4]". Further, in step S80 of the present control routine, the control device 190 may output to the light driving device 175 an instruction to make this locus of movement larger in order to increase the attention-drawing effect, as the degree of danger of the person 500 estimated by the danger degree estimating section 170 increases.

[Illumination Form 4]

Figure 9:
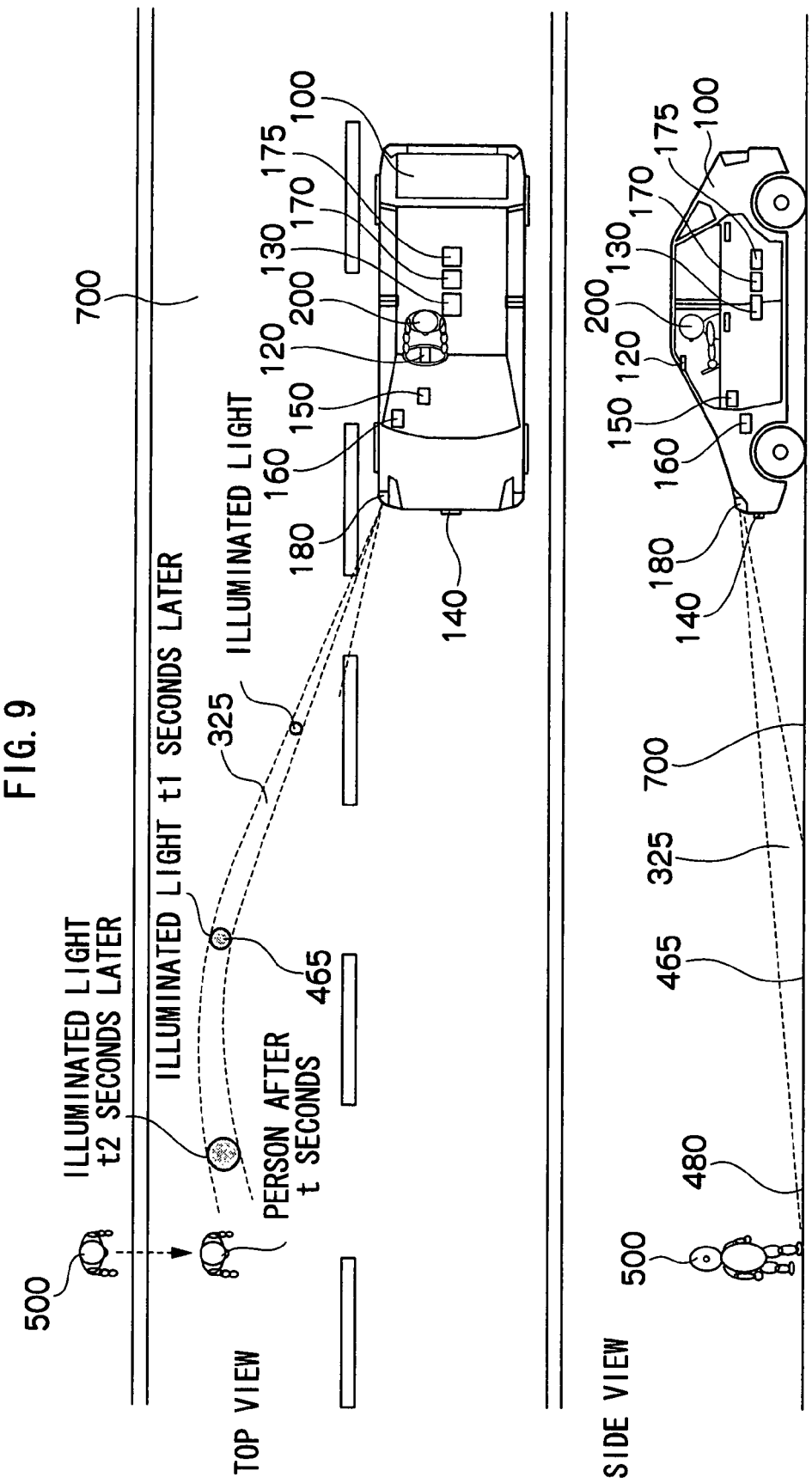
FIG. 9 is a drawing showing illumination form 4.

As shown in FIG. 9, the illuminated position on the road surface 700 of illuminated light 325 of an illumination pattern 465, which is a single spotlight, moves in the shape of a hook from the own vehicle 100 toward the person 500 so as to show the moving direction of the person 500 assumed by the danger degree estimating section 170. Namely, in present illumination form 4, the control device 190 outputs to the light driving device 175 an instruction such that the locus of movement of the illuminated position on the road surface 700 becomes curved.

[Illumination Form 5]

Figure 10:
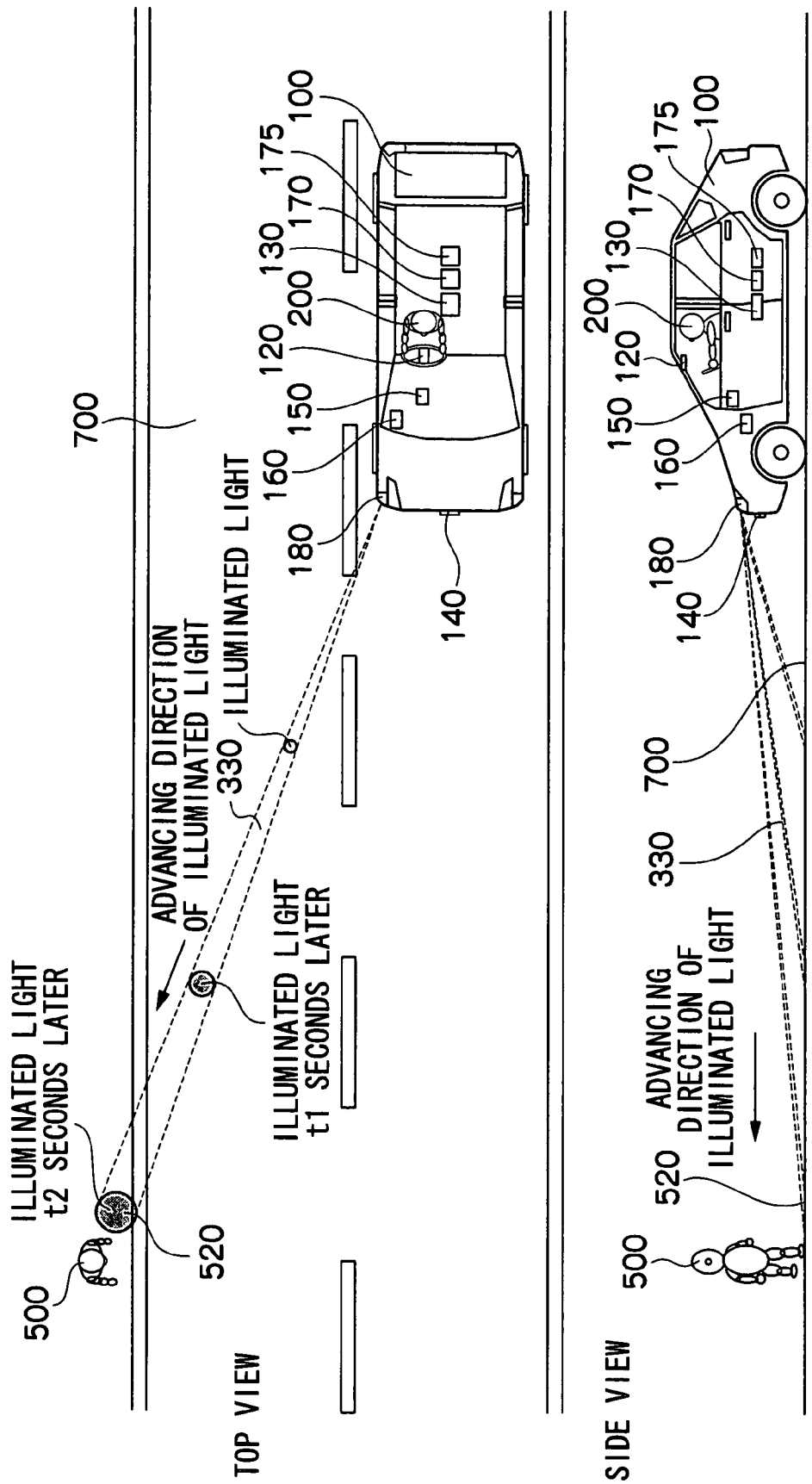
FIG. 10 is a drawing showing illumination form 5.

As shown in FIG. 10, the illuminated position on the road surface 700 of illuminated light 330 of an illumination pattern 520, which is a single spotlight, moves from the own vehicle 100 toward the person 500. The direction of movement of the illuminated position shows the direction from the own vehicle 100 toward the person 500. This moving of the illuminated position of the illuminated light 330 on the road surface 700 has a strong attention-drawing effect on the driver 200, and a strong effect of causing the driver 200 to perceive the person 500 who is assumed to be in danger.

[Illumination Form 6]

Figure 11:
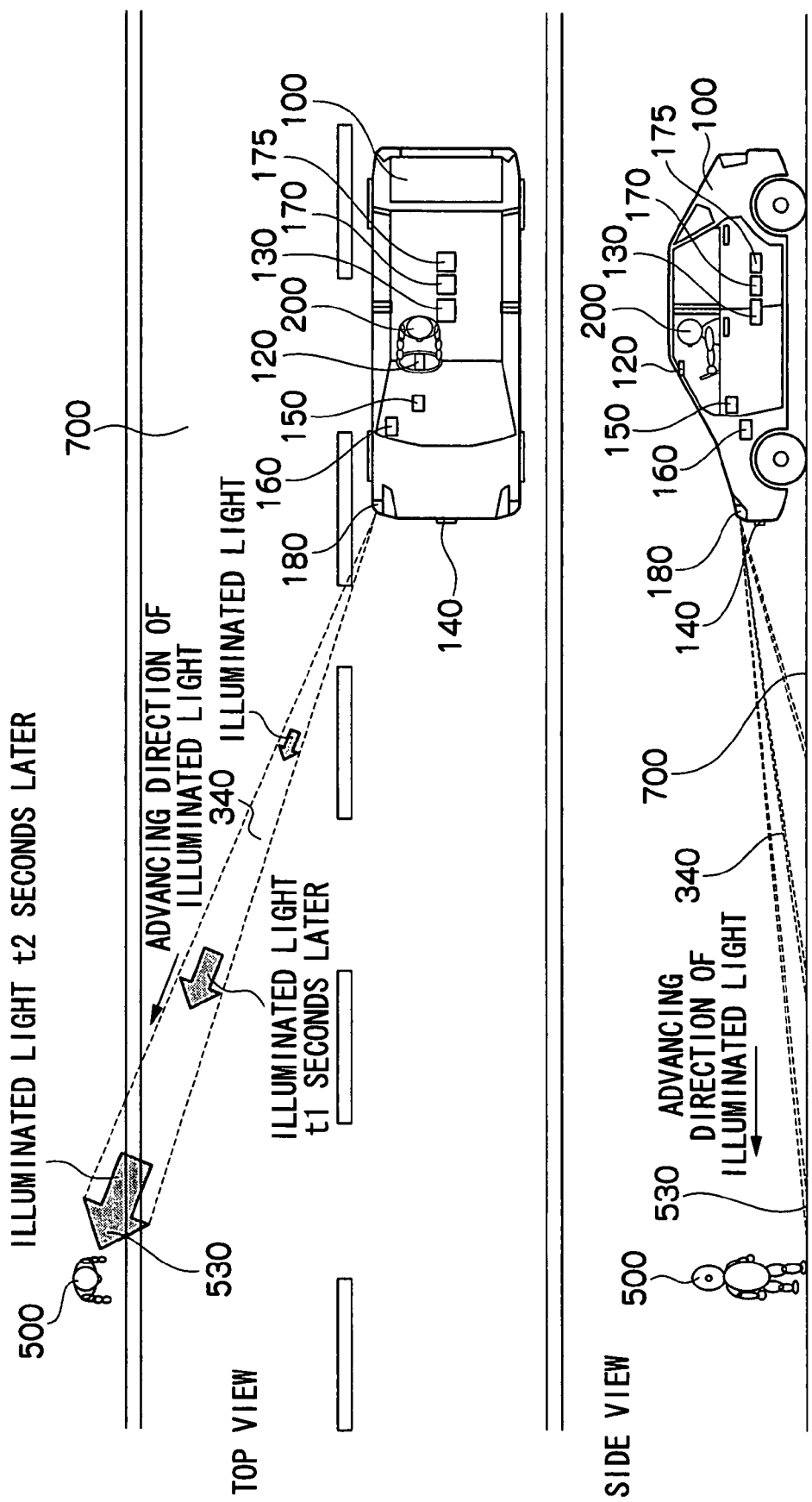
FIG. 11 is a drawing showing illumination form 6.

As shown in FIG. 11, the illuminated position on the road surface 700 of illuminated light 340 of an illumination pattern 530, which is an arrow, moves from the own vehicle 100 toward the person 500. The direction of movement of the illuminated position shows the direction of the person 500 from the own vehicle 100. In the same way as the moving of the illuminated light 330 shown in FIG. 10, this moving of the illuminated position of the illuminated light 340 on the road surface 700 has a strong attention-drawing effect on the driver 200, and a strong effect of causing the driver 200 to perceive the person 500 who is assumed to be in danger. Further, from the display of the arrow, the driver 200 can instantaneously specify the direction in which the person 500 is positioned.

[Illumination Form 7]

Figure 12:
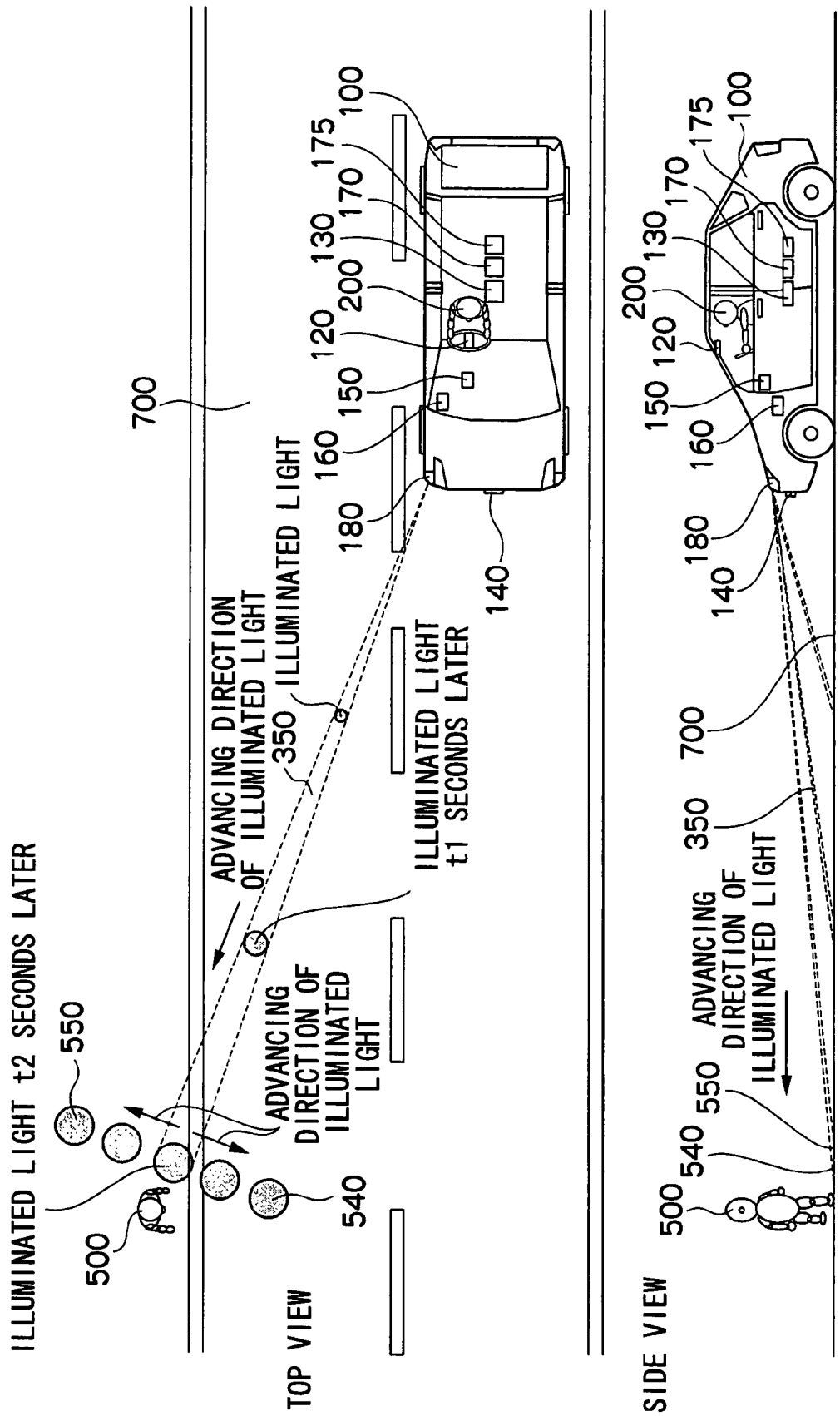
FIG. 12 is a drawing showing illumination form 7.

As shown in FIG. 12, the illuminated position on the road surface 700 of illuminated light 350 of an illumination pattern 540, which is a single spotlight, moves from the own vehicle 100 toward the person 500. The direction of movement of the illuminated position shows the direction of the person 500 from the own vehicle 100. Further, the illuminated light 350 divides at this side of the person 500, and the illuminated positions on the road surface 700 move left and right. An illumination pattern 550 of these spotlights which are divided at this side of the person 500 shows the distance from the own vehicle 100 to the person 500.

[Illumination Form 8]

Figure 13:
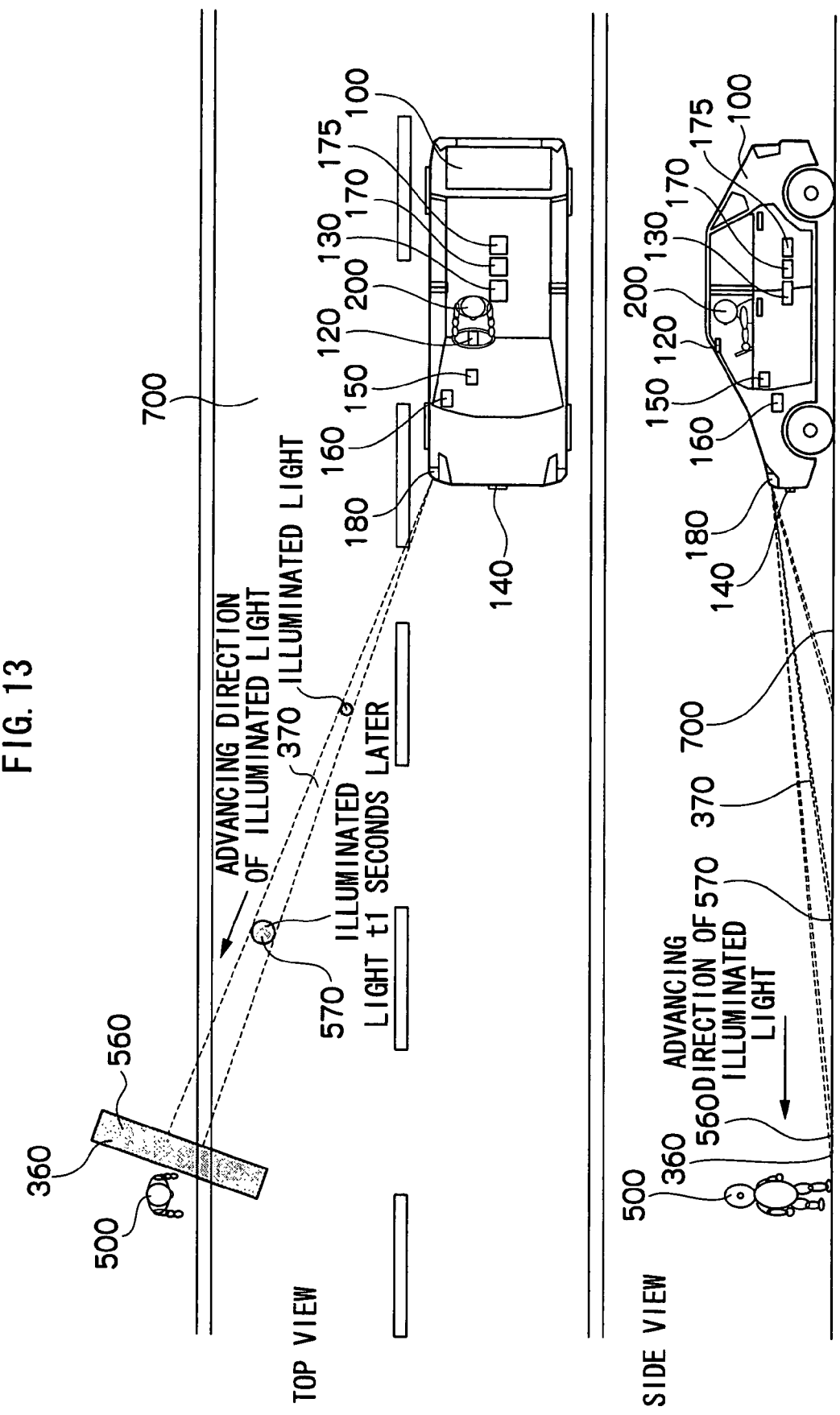
FIG. 13 is a drawing showing illumination form 8.

As shown in FIG. 13, in illumination form 8, illuminated light 360 and illuminated light 370 are illuminated from the variable light distribution light 180. The illuminated light 360 of an illumination pattern 560, which shows the distance from the own vehicle 100 to the person 500, is always illuminated stationarily. The illuminated position on the road surface 700 of the illuminated light 370 of an illumination pattern 570, which shows the direction of the person 500 from the own vehicle 100, moves from the own vehicle 100 toward the person 500.

[Illumination Form 9]

Figure 14:
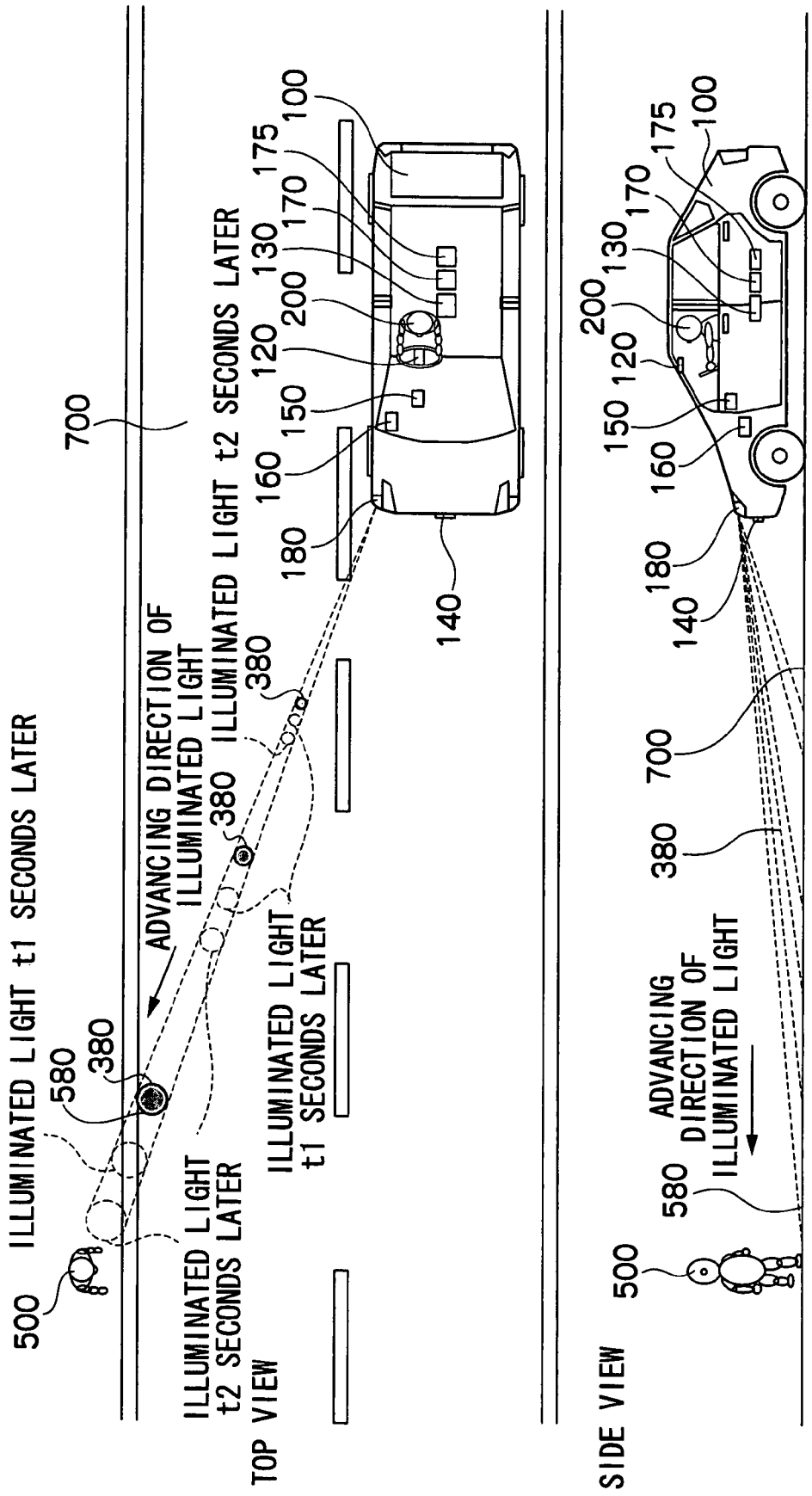
FIG. 14 is a drawing showing illumination form 9.

As shown in FIG. 14, the illuminated position on the road surface 700 of illuminated light 380 of an illumination pattern 580, which has plural spotlights, moves from the own vehicle 100 toward the person 500. The direction of movement of the illuminated position shows the direction of the person 500 from the own vehicle 100.

Illumination form 9 is a form in which the single spotlight of illumination form 5 explained in FIG. 10 is made to be plural. The present inventors have empirically experimented and discovered the effects of making the spotlight plural. These experimental results will be described hereinafter. It was learned that, when the illuminated position on the road surface 700 of the illumination pattern 520 which is a single spotlight is moved from the own vehicle toward the person 500, the driver 200 can certainly perceive the person 500 who is assumed to be in danger, but the person 500 feels fearful because the single spotlight is heading from the own vehicle 100 toward him/her at a high speed. Here, it was learned that, when the illuminated position on the road surface 700 of the illuminated light 380 of the illumination pattern 580, in which plural spotlights are arranged on a straight line heading from the own vehicle 100 toward the person 500, is moved from the own vehicle 100 toward the person 500, the person 500 feels less fearful as compared with the case of the illumination pattern of the single spotlight, owing to the existence of the second and third spotlights of the illumination pattern 380.

Note that the illuminated lights shown in FIG. 9 through FIG. 14 may be illuminated to beneath the eyes of the person 500. Further, in step S80 of the present control routine, as the degree of danger of the person 500 estimated by the danger degree estimating section 170 increases, the control device 190 may output to the light driving device 175 an instruction to quicken the moving speed of the illuminated position on the road surface 700, or to make the shape of the illumination pattern larger, or to make the flashing period of the flashing state of the light shorter, or to make the color of the illumination pattern approach the color red, or to make the locus of movement of the illuminated position of the light larger, in order to increase the attention-drawing effect.

For example, in a case in which the time t until the own vehicle 100 and the person 500 collide is less than or equal to a first predetermined time (e.g., is less than or equal to 6 seconds), the control device 190 may output to the light driving device 175 an instruction such that the number of the illumination patterns of the light illuminated from the variable light distribution light 180 (the illumination pattern 520 which is a spotlight, the illumination pattern 530 which is an arrow, the illumination pattern 540 which is a spotlight, the illumination pattern 570 which is a spotlight, or the like) is made to be 1, and such that the speed at which the illuminated position of the light on the road surface moves becomes a predetermined speed Vf. Further, for example, in a case in which the time t until a collision is greater than the first predetermined time and less than or equal to a second predetermined time (e.g., is greater than 6 seconds and less than or equal to 10 seconds), the control device 190 may output to the light driving device 175 an instruction such that the number of the illumination patterns of the light illuminated from the variable light distribution light 180 is made to be 1 and such that the speed at which the illuminated position of the light on the road surface moves becomes a predetermined speed Vs. Still further, for example, in a case in which the time t until a collision is greater than the second predetermined time (e.g., is greater than 10 seconds), the control device 190 may output to the light driving device 175 an instruction such that the number of the illumination patterns of the light illuminated from the variable light distribution light 180 is made to be plural and such that the speed at which the illuminated position of the light on the road surface moves becomes the predetermined speed Vs. Here, the relationship between the predetermined speed Vf and the predetermined speed Vs is expressed as Vf>Vs.

Further, although the present exemplary embodiment describes an example of computing the moving direction of the own vehicle 100 by using the steering angle sensor 150, the present invention is not limited to the same. Namely, the moving direction of the own vehicle 100 may be computed by using a gyro, or a navigation device which receives GPS signals and computes the position.

Second Exemplary Embodiment

An alerting illumination device relating to a second exemplary embodiment of the present invention will be described next. Note that structures and processings which are similar to those of the first exemplary embodiment are denoted by the same reference numerals and description thereof is omitted.

Figure 15:
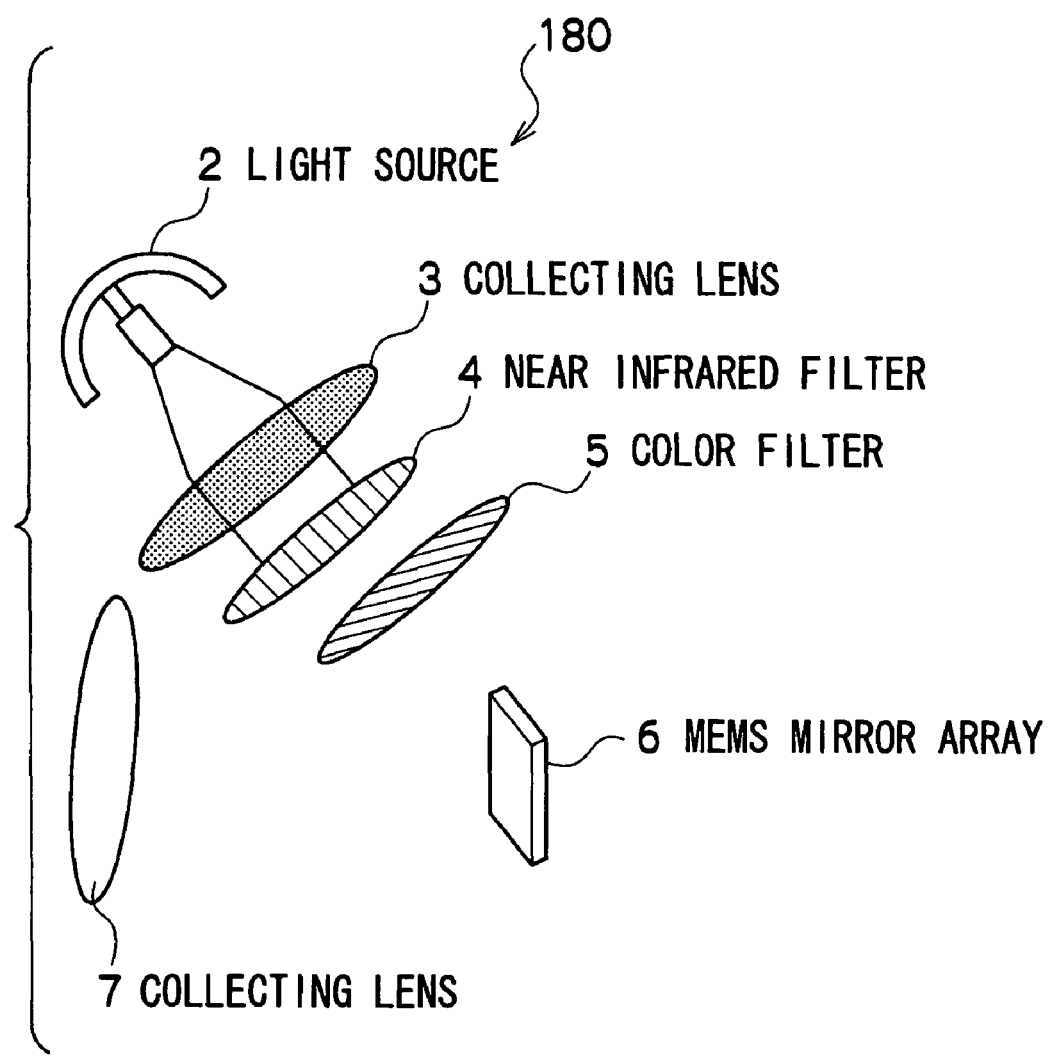
FIG. 15 is a drawing for explaining a variable light distribution light of a second exemplary embodiment of the present invention.

In the present exemplary embodiment, as shown in FIG. 15, the variable light distribution light 180 has a light source 2, a collecting lens 3, a near infrared filter 4, a color filter 5, an MEMS mirror array 6 controlling the light distribution by reflecting the light from the light source 2, and a collecting lens 7.

Figure 16:
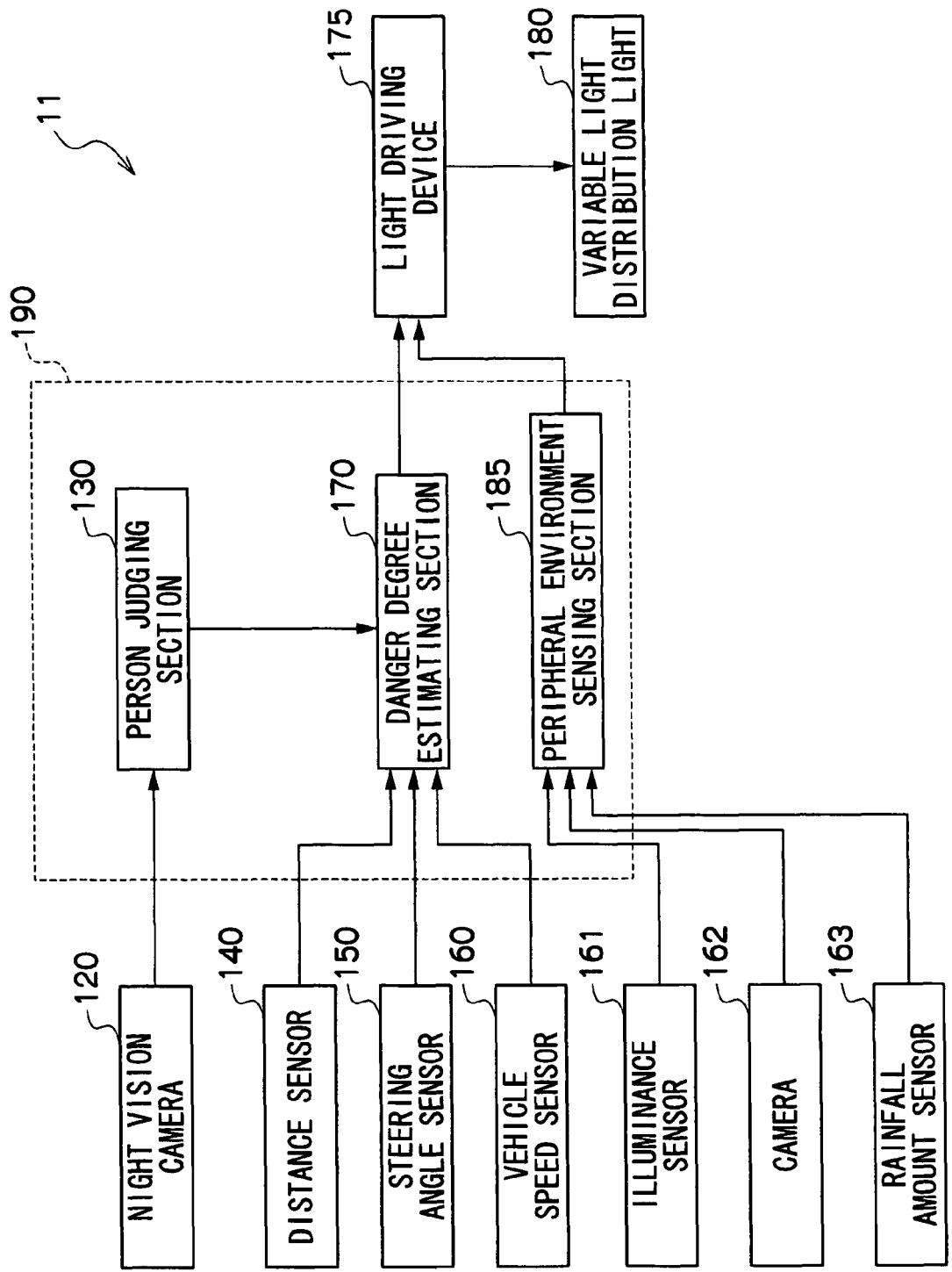
FIG. 16 is a block diagram of an alerting illumination device of the second exemplary embodiment of the present invention.

Further, in the present exemplary embodiment, an alerting illumination device 11 has, in addition to the respective structures of the above-described first exemplary embodiment, an illuminance sensor 161, a camera 162, and a rainfall amount sensor 163, as shown in FIG. 16.

The illuminance sensor 161 detects the illuminance (brightness) of the periphery of the own vehicle 100.

An optical camera for example is used as the camera 162. The camera 162 photographs the road surface 700 on which the own vehicle 100 is traveling, and outputs the image obtained by photographing as image data.

The rainfall amount sensor 163 detects the amount of rainfall.

The illuminance sensor 161, the camera 162, and the rainfall amount sensor 163 are used in order to detect the state of the peripheral environment of the own vehicle 100.

Further, in the first exemplary embodiment, the control device 190 has the person judging section 130 and the danger degree estimating section 170. However, in the present exemplary embodiment, the control device 190 additionally has a peripheral environment sensing section 185.

On the basis of a detection signal from the illuminance sensor 161, the peripheral environment sensing section 185 computes the brightness of the periphery of the own vehicle 100. In a case in which the computed brightness is less than or equal to a predetermined value, the peripheral environment sensing section 185 outputs to the light driving device 175 an instruction such that the strength of the illuminated light becomes less than or equal to a predetermined value. A savings in energy is thereby devised because the strength of the light illuminated from the variable light distribution lamp 180 weakens due to the control of the light driving device 175 to which the instruction from the control device 190 is outputted.

Further, by comparing the image data of the road surface 700 from the camera 162 and image data of a good road surface which is stored in advance in an HDD (Hard Disk Drive), the peripheral environment sensing section 185 judges whether the road surface state of the road surface 700 is good, or whether the road surface state is poor. Note that a road surface whose road surface state is poor is called a bad road hereinafter. Here, bad roads include road surfaces at which there exist gravel, stones that impede traveling, or the like.

Further, on the basis of the results of detection of the rainfall amount sensor 163, the peripheral environment sensing section 185 judges whether or not the weather at the periphery of the own vehicle 100 is rainy.

Figure 17A:
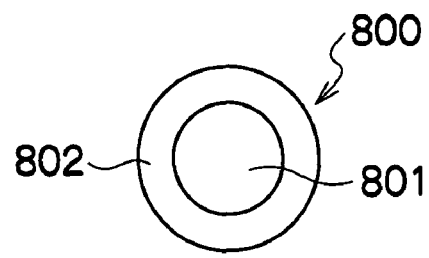
FIG. 17A through FIG. 17D are drawings showing illumination patterns of the second exemplary embodiment of the present invention.

In a case in which the peripheral environment sensing section 185 judges that the road surface state is poor, i.e., judges that the road surface 700 on which the own vehicle 100 is traveling is a bad road, or judges that the weather is rainy, the peripheral environment sensing section 185 outputs an instruction to the light driving device 175 to illuminate light of an illumination pattern 800 which is shown in FIG. 17A and in which the luminance of a surrounding, ring-patterned ring portion 802 is higher than that of a central portion 801, instead of the above-described illumination pattern 465, 520, 530, 540, 570 or 580. The illumination strength of the edge portion of the illumination pattern 800 is greater than the illumination strength of the central portion. In this way, both the driver 200 and the person 500 can be alerted even more.

Figure 17B:
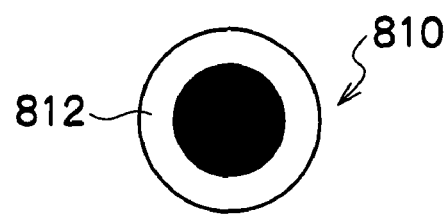
Figure 17C:
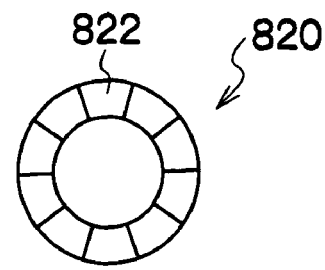
Figure 17D:
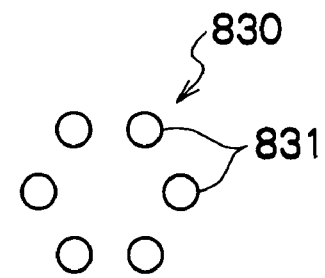

Note that, in a case in which it is judged that there is a bad road or in a case in which it is judged that it is rainy, the peripheral environment sensing section 185 may output to the light driving device 175 an instruction to illuminate light of an illumination pattern 810 which is shown in FIG. 17B and in which only light of a ring portion 812 is illuminated. Or, the peripheral environment sensing section 185 may output to the light driving device 175 an instruction to illuminate light of an illumination pattern 820 which is shown in FIG. 17C and in which a ring portion 822 is divided into sections. Or, the peripheral environment sensing section 185 may output to the light driving device 175 an instruction to illuminate light of an illumination pattern 830 which is shown in FIG. 17D and which is structured to include a plurality of circular illumination patterns 831.

Figure 18A:
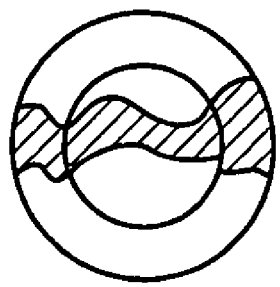
FIG. 18A through FIG. 18C are drawings showing other examples of illumination patterns of the second exemplary embodiment of the present invention.
Figure 18B:
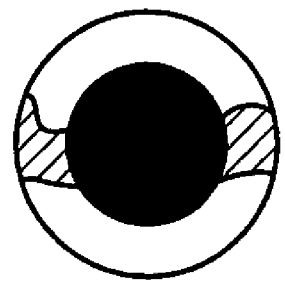
Figure 18C:
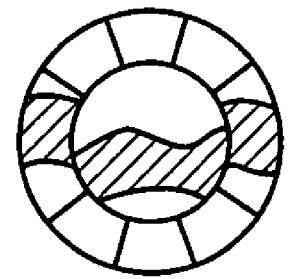

Note that, at the above-described illumination pattern 800, the luminance within the illumination pattern may be varied as shown in FIG. 18A. Similarly, at the above-described illumination pattern 810, the luminance within the illumination pattern may be varied as shown in FIG. 18B, and, at the above-described illumination pattern 820, the luminance within the illumination pattern may be varied as shown in FIG. 18C.

Moreover, in a case in which the peripheral environment sensing section 185 judges that there is a bad road or judges that it is rainy, the peripheral environment sensing section 185 may output an instruction to the light driving device 175 to illuminate, during a predetermined time period and instead of the above-described illumination pattern 465, 520, 530, 540, 570 or 580, light of the above-described illumination pattern 400, 430, 460, or light of an illumination pattern 840 which is shown in FIG. 19 and whose width increases from the own vehicle 100 toward the person 500. In this way, in cases in which the road is bad or it is rainy or the like, both the driver 200 and the person 500 can be alerted even more.

Note that, although the present exemplary embodiment describes an example of detecting the road surface state by using the camera 162, the present invention is not limited to the same. Namely, the road surface state may be detected by using a vehicle probe device which can detect the road surface state. Or, the road surface state may be detected by using a road surface μ (slip ratio) sensor. Note that, in this case, the road surface state is judged to be poor when the slip ratio is greater than or equal to a predetermined value. Further, tire air pressure sensors may be used, and the road surface state may be detected on the basis of the air pressures of the tires detected by the tire air pressure sensors.

An alerting illumination device of an aspect of the present invention includes: a detecting component that detects a person; a danger degree estimating component that estimates a degree of danger, with respect to an own vehicle, of the person detected by the detecting component; a danger assuming component that, on the basis of the degree of danger estimated by the danger degree estimating component, assumes whether or not the person detected by the detecting component is in danger with respect to the own vehicle; an illuminating component that illuminates light; and a controlling component that, in a case in which the danger assuming component assumes that the person is in danger, controls the illuminating component such that light, which shows a direction of the person who is assumed to be in danger and a distance to the person, is illuminated onto a road surface.

In accordance with the alerting illumination device of the present invention, light, which shows the direction of a person assumed to be in danger and the distance to the person, is illuminated from the illuminating component onto the road surface. Therefore, both the driver and the person can be alerted, regardless of the color of the person's clothes.

The controlling component of the present invention may control the illuminating component such that an illuminated position on the road surface moves from the own vehicle toward the person who is assumed to be in danger. In this way, at the time when the driver and the person assumed to be in danger are alerted, the illuminated light does not head back toward the driver, and therefore, alerting is carried out without the driver experiencing a disharmonious feeling.

The controlling component of the present invention may control the illuminating component such that a moving speed of the illuminated position becomes faster as the degree of danger estimated by the danger degree estimating component becomes higher.

The controlling component of the present invention may further control the illuminating component such that light, which shows a moving direction of the person who is assumed to be in danger, is illuminated on the road surface.

The controlling component of the present invention can control the illuminating component as any of the following.

The controlling component controls the illuminating component such that a locus of movement of an illuminated position on the road surface becomes curved, so as to show the moving direction of the person who is assumed to be in danger.

The controlling component controls the illuminating component so as to illuminate a line of light which extends from the own vehicle to the person who is assumed to be in danger and shows a direction of the person, and a line of light which extends laterally at this side of the person and shows a distance from the own vehicle to the person.

The controlling component controls the illuminating component such that an illuminated position on the road surface of at least one illuminated light moves from the own vehicle toward the person who is assumed to be in danger so as to show a direction of the person.

The controlling component controls the illuminating component such that an illuminated position on the road surface of at least one illuminated light moves from the own vehicle toward the person who is assumed to be in danger so as to show a direction of the person and a distance to the person, and such that, at a point in time when the illuminated position reaches this side of the person, the illuminated light is divided, and respective illuminated positions on the road surface of divided illuminated lights move left and right.

The controlling component controls the illuminating component so as to illuminate a line of light which extends laterally at this side of the person who is assumed to be in danger and shows a distance to the person, and at least one illuminated light whose illuminated position on the road surface moves from the own vehicle toward the person so as to show a direction of the person.

Further, the controlling component of the present invention may control at least one of a color of light illuminated from the illuminating component, an illumination pattern of the light, a flashing state of the light, and a locus of movement of an illuminated position of the light, such that an attention-drawing effect increases as the degree of danger estimated by the danger degree estimating component increases. By effecting control in this way, it is easy for the driver and the person assumed to be in danger to psychologically perceive the illuminated position.

The alerting illumination device of the present invention may further have an environment detecting component that detects an environmental state of the own vehicle, and the controlling component may further control the illuminating component such that a predetermined light, which is based on the environmental state detected by the environment detecting component, is illuminated. In this way, light that corresponds to the environmental state of the own vehicle is illuminated, and both the driver and the person can be alerted even more.

The environment detecting component may detect a road surface state of the road surface or weather, and, on the basis of the detected road surface state or weather, the controlling component may control the illuminating component such that, in a case in which the road surface state is poor or in a case in which the weather is rainy, light, at which an illumination strength of an edge portion is greater than an illumination strength of a central portion, is illuminated.

The environment detecting component may detect a road surface state of the road surface or weather, and, on the basis of the detected road surface state or weather, the controlling component may control the illuminating component such that, in a case in which the road surface state is poor or in a case in which the weather is rainy, light continues to be illuminated during a given time period.

The environment detecting component may detect brightness of a periphery of the own vehicle, and, on the basis of the detected brightness, the controlling component may control the illuminating component such that, in a case in which the brightness is less than or equal to a predetermined value, light whose illumination strength is less than or equal to a predetermined value is illuminated.

As described above, in accordance with the alerting illumination device of the present invention, light, which shows the direction from the own vehicle of the person who is assumed to be in danger and the distance to that person, is illuminated onto the road surface. Therefore, both the driver and the person assumed to be in danger can be alerted regardless of the color of the person's clothes.

What is claimed is:

1. An alerting illumination device mounted in a vehicle comprising:
    a detecting component that detects the presence of a person;
    a danger degree estimating component that estimates a degree of danger, with respect to a subject vehicle, of the person detected by the detecting component;
    a danger assuming component that, on the basis of the degree of danger estimated by the danger degree estimating component, assumes whether or not the person detected by the detecting component is a danger to the subject vehicle;
    an illuminating component that illuminates light; and
    a controlling component that, in a case in which the danger assuming component assumes that the person is a danger, controls the illuminating component such that light, which shows a direction of the person who is assumed to be a danger and a distance to the person, is illuminated onto a road surface;
    wherein the controlling component further controls the illuminating component such that light, which shows a moving direction of the person who is assumed to be a danger, is illuminated on the road surface.

2. The alerting illumination device of claim 1, wherein the controlling component controls the illuminating component such that an illuminated position on the road surface moves from the subject vehicle toward the person who is assumed to be a danger.

3. The alerting illumination device of claim 2, wherein the controlling component controls the illuminating component such that a moving speed of the illuminated position becomes faster as the degree of danger estimated by the danger degree estimating component becomes higher.

4. The alerting illumination device of claim 2, wherein the controlling component controls the illuminating component such that an illuminated position on the road surface of at least one illuminated light is illustrated from the subject vehicle at regular intervals, increasingly approaching the person who is assumed to be a danger so as to show a direction of the person.

5. The alerting illumination device of claim 2, wherein the controlling component controls the illuminating component such that an illuminated position on the road surface of at least one illuminated light moves from the subject vehicle toward the person who is assumed to be a danger so as to show a direction of the person and a distance to the person, and such that, at a point in time when the illuminated position reaches a near side of the person, the illuminated light is divided, and respective illuminated positions on the road surface of divided illuminated lights move left and right.

6. The alerting illumination device of claim 2, wherein the controlling component controls the illuminating component so as to illuminate a line of light which extends laterally at a near side of the person who is assumed to be a danger and shows a distance to the person, and at least one illuminated light whose illuminated position on the road surface moves from the subject vehicle toward the person so as to show a direction of the person.

7. The alerting illumination device of claim 1, wherein the controlling component controls the illuminating component such that a locus of movement of an illuminated position on the road surface becomes curved, so as to show the moving direction of the person who is assumed to be a danger.

8. The alerting illumination device of claim 1, wherein the controlling component controls the illuminating component so as to illuminate a line of light which extends from the subject vehicle to the person who is assumed to be a danger and shows a direction of the person, and a line of light which extends laterally at a near side of the person and shows a distance from the subject vehicle to the person.

9. The alerting illumination device of claim 1, wherein the controlling component controls at least one of a color of light illuminated from the illuminating component, an illumination pattern of the light, a flashing state of the light, and a locus of movement of an illuminated position of the light, such that an attention-drawing effect increases as the degree of danger estimated by the danger degree estimating component increases.

10. The alerting illumination device of claim 1, further comprising an environment detecting component that detects an environmental state of the subject vehicle,
   wherein the controlling component further controls the illuminating component such that a predetermined light, which is based on the environmental state detected by the environment detecting component, is illuminated.

11. The alerting illumination device of claim 10, wherein the environment detecting component detects at least one of a road surface state of the road surface and weather, and
   on the basis of at least one of the detected road surface state and weather, the controlling component controls the illuminating component such that, in a case in which the road surface state is poor or in a case in which the weather is rainy, light, at which an illumination strength of an edge portion is greater than an illumination strength of a central portion, is illuminated.

12. The alerting illumination device of claim 10, wherein the environment detecting component detects at least one of a road surface state of the road surface and weather, and
   on the basis of at least one of the detected road surface state and weather, the controlling component controls the illuminating component such that, in a case in which the road surface state is poor or in a case in which the weather is rainy, light continues to be illuminated during a given time period.

13. The alerting illumination device of claim 10, wherein the environment detecting component detects brightness of a periphery of the subject vehicle, and
   on the basis of the detected brightness, the controlling component controls the illuminating component such that, in a case in which the brightness is less than or equal to a predetermined value, light whose illumination strength is less than or equal to a predetermined value is illuminated.

14. An alerting illumination device mounted in a vehicle comprising:
   a detecting component that detects the presence of a person;
   a danger degree estimating component that estimates a degree of danger, with respect to a subject vehicle, of the person detected by the detecting component;
   a danger assuming component that, on the basis of the degree of danger estimated by the danger degree estimating component, assumes whether or not the person detected by the detecting component is a danger to the subject vehicle;
   an illuminating component that illuminates light; and
   a controlling component that, in a case in which the danger assuming component assumes that the person is a danger, controls the illuminating component such that light, which shows a direction of the person who is assumed to be a danger and a distance to the person, is illuminated onto a road surface;
   the controlling component controls the illuminating component such that an illuminated position on the road surface moves from the subject vehicle toward the person who is assumed to be a danger;
   the controlling component further controls the illuminating component such that a moving speed of the illuminated position becomes faster as the degree of danger estimated by the danger degree estimating component becomes higher.

15. An alerting illumination device mounted in a vehicle comprising:
   a detecting component that detects the presence of a person;
   a danger degree estimating component that estimates a degree of danger, with respect to a subject vehicle, of the person detected by the detecting component;
   a danger assuming component that, on the basis of the degree of danger estimated by the danger degree estimating component, assumes whether or not the person detected by the detecting component is a danger to the subject vehicle;
   an illuminating component that illuminates light; and
   a controlling component that, in a case in which the danger assuming component assumes that the person is a danger, controls the illuminating component such that light, which shows a direction of the person who is assumed to be a danger and a distance to the person, is illuminated onto a road surface;
   the controlling component controls the illuminating component such that an illuminated position on the road surface moves from the subject vehicle toward the person who is assumed to be a danger;
   the controlling component controls the illuminating component such that an illuminated position on the road surface of at least one illuminated light is illustrated from the subject vehicle at regular intervals, increasingly approaching the person who is assumed to be a danger so as to show a direction of the person.

* * * * *